(12) United States Patent
Liu (10) Patent No.: US 9,578,490 B2
(45) Date of Patent: Feb. 21, 2017

(54) METHOD AND SYSTEM FOR UPDATING ELECTRONIC BUSINESS CARDS (71) Applicant: TENCENT TECHNOLOGY (SHENZHEN) COMPANY LIMITED, Shenzhen (CN)

(72) Inventor: Chunying Liu, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/608,755

(22) Filed: Jan. 29, 2015

(65) Prior Publication Data
US 2015/0140976 A1 May 21, 2015

Related U.S. Application Data (63) Continuation of application No. PCT/CN2013/080097, filed on Jul. 25, 2013.

(30) Foreign Application Priority Data

Jul. 30, 2012 (CN) .......................... 2012 1 0266450

(51) Int. Cl.
*H04L 12/58* (2006.01)
*H04W 8/20* (2009.01)
(Continued)

(52) U.S. Cl.
CPC ....... *H04W 8/205* (2013.01); *H04M 1/274516* (2013.01); *H04M 1/72527* (2013.01);
(Continued)

(58) Field of Classification Search
CPC ............... H04L 67/1095; H04L 67/306; H04L 61/1594; H04L 51/22; H04L 41/026; H04L 51/14; H04L 12/5815; H04L 67/30; H04L 67/303; H04W 4/02; H04W 88/02; H04W 8/14; H04W 4/12; H04W 4/206; H04W 4/001; H04W 8/24; G06Q 10/10; G06Q 50/01; H04M 2203/655
See application file for complete search history.

(56) References Cited

U.S. PATENT DOCUMENTS

2002/0049751 A1* 4/2002 Chen ...................... G06Q 10/10
2005/0120084 A1* 6/2005 Hu ....................... G06Q 10/107
709/206
(Continued)

FOREIGN PATENT DOCUMENTS

CN 101399872 A 4/2009
CN 101599974 A 12/2009

OTHER PUBLICATIONS

International Search Report for Application No. PCT/CN2013/080097 dated Nov. 7, 2013, and its English translation thereof.
(Continued)

*Primary Examiner* — Olumide T Ajibade Akonai
(74) *Attorney, Agent, or Firm* — Harness, Dickey & Pierce, P.L.C.

(57) ABSTRACT

A method for updating electronic business cards (VCards). A receiving terminal which is to synchronize a VCard with a sending terminal is determined. It is determined whether there is an update of a VCard in the sending terminal. If there is an update, the sending terminal sends an updated VCard to the receiving terminal or instructs a third party device to send the updated VCard to the receiving terminal. The receiving terminal receives the updated VCard, and updates a VCard stored in the receiving terminal using the updated VCard.

20 Claims, 2 Drawing Sheets (51) Int. Cl.
    *H04W 4/16* (2009.01)
    *H04M 1/725* (2006.01)
    *H04W 4/12* (2009.01)
    *H04W 8/18* (2009.01)
    *H04M 1/2745* (2006.01)
    *H04L 29/12* (2006.01)
    *H04M 17/00* (2006.01)

(52) U.S. Cl.
    CPC ............... *H04W 4/12* (2013.01); *H04W 4/16* (2013.01); *H04W 8/183* (2013.01); *H04L 61/1594* (2013.01); *H04M 17/103* (2013.01); *H04M 2250/60* (2013.01)

(56) References Cited

U.S. PATENT DOCUMENTS

| | | | | |
|---|---|---|---|---|
| 2005/0233697 | A1* | 10/2005 | Yu | H04M 1/274516 455/41.3 |
| 2005/0245247 | A1* | 11/2005 | Seo | H04L 67/1095 455/418 |
| 2007/0050508 | A1* | 3/2007 | Shan | H04L 29/12047 709/227 |
| 2008/0133677 | A1* | 6/2008 | Pattabhiraman | G06Q 10/00 709/206 |
| 2009/0157732 | A1* | 6/2009 | Hao | H04M 3/53325 |
| 2010/0015954 | A1* | 1/2010 | Yang | H04L 67/306 455/412.1 |
| 2010/0217614 | A1* | 8/2010 | Brown | H04L 67/1095 705/1.1 |
| 2011/0113084 | A1* | 5/2011 | Ramnani | G06Q 30/02 709/201 |
| 2011/0258159 | A1 | 10/2011 | Mitchell | |
| 2012/0095771 | A1* | 4/2012 | Wang | H04W 4/003 705/1.1 |
| 2013/0311892 | A1* | 11/2013 | Hsieh | G06Q 10/10 715/738 |

OTHER PUBLICATIONS

International Preliminary Report on Patentability for Application No. PCT/CN2013/080097, dated Feb. 3, 2015.

* cited by examiner

METHOD AND SYSTEM FOR UPDATING ELECTRONIC BUSINESS CARDS

CROSS-REFERENCE TO RELATED APPLICATIONS

This application is a continuation of International Patent Application No. PCT/CN2013/080097 filed on Jul. 25, 2013. This application claims the benefit and priority of Chinese Application No. 201210266450.6, filed Jul. 30, 2012. The entire disclosures of each of the above applications are incorporated herein by reference.

FIELD

The present disclosure relates to a method and a system for updating electronic business cards.

BACKGROUND

This section provides background information related to the present disclosure which is not necessarily prior art.

Presently, content of paper business cards can be made electronic and stored in various terminals. An electronic business card (also referred to as a VCard) generally includes information of a person, e.g., name, nickname, gender, address information, phone number, marital status, workplace, e-mail address, notes, and the like, and may also include a head portrait and an audio clip for self-introduction.

Besides exchanging physical business cards, people now can exchange various VCards. For example, a person may input content of a VCard, or copy a VCard, or capture a photo of a VCard, and send the inputted content or the copy or the photo of the VCard to another person through various means e.g., using an instant messaging (IM) tool, via an SMS or MMS, via a data instruction or the like.

SUMMARY

This section provides a general summary of the disclosure, and is not a comprehensive disclosure of its full scope or all of its features.

Various embodiments provide a method for updating VCards to improve the efficiency of updating VCards. Various embodiments also provide a system for updating VCards to improve the efficiency of updating VCards.

A method for updating VCards may include:
  determining a receiving terminal which is to synchronize a VCard with a sending terminal;
  judging whether there is an update of the VCard in the sending terminal, sending, by the sending terminal, the updated VCard to the receiving terminal or instructing, by the sending terminal, a third party device to send the updated VCard to the receiving terminal if there is an update; and
  receiving, by the receiving terminal, the updated VCard, and updating a VCard stored in the receiving terminal using the updated VCard.

A system for updating VCards, including a sending terminal and a receiving terminal; wherein
  the sending terminal is configured for determining a receiving terminal which is to synchronize a VCard with the sending terminal, judging whether there is an update of the VCard stored in the sending terminal, sending an updated VCard to the receiving terminal, or instructing a third party device to send the updated VCard to the receiving terminal in response to a determination that there is an update; and
  the receiving terminal is configured for receiving the updated VCard, and updating a VCard stored in the receiving terminal using the updated VCard.

According to the above embodiments, a receiving terminal, which is to synchronize a VCard with a sending terminal, is determined; it is determined whether there is an update of the VCard stored in the sending terminal; if there is an update, the sending terminal sends an updated VCard to the receiving terminal or instructs a third party device to send the updated VCard to the receiving terminal; the receiving terminal receives the updated VCard, and updates a VCard stored in the receiving terminal using the updated VCard. As such, after a VCard is updated, another user that stores the previous version of the VCard may receive the updated VCard timely and automatically update the VCard. Therefore, the efficiency of updating VCards is improved.

According to various embodiments, when information in a VCard is partially or totally changed, the previous VCard can be updated in both the sending terminal and the receiving terminal.

According to various embodiments, other users may get information about an update in the VCard of a contact in a timely manner. As such, users can establish communication using correct contact information, and potential economic loss can be avoided.

The various embodiments can be applied to various terminal devices and to terminal devices running different platforms, and thus has wide applicability.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Quantities of an element, unless specifically mentioned, may be one or a plurality of, or at least one.

Examples are hereinafter described in detail with reference to the accompanying drawings to make the objective, technical scheme and merits of the present invention more apparent.

According to conventional techniques of exchanging VCards, when a user updates a VCard, other users that also store the VCard cannot timely get acknowledgment of the update, and cannot obtain the updated VCard. In addition, according to conventional mechanisms, when contents of a user's VCard changed so significantly that the previous VCard cannot be identified, thus the previous VCard cannot be automatically updated.

Figure 1:
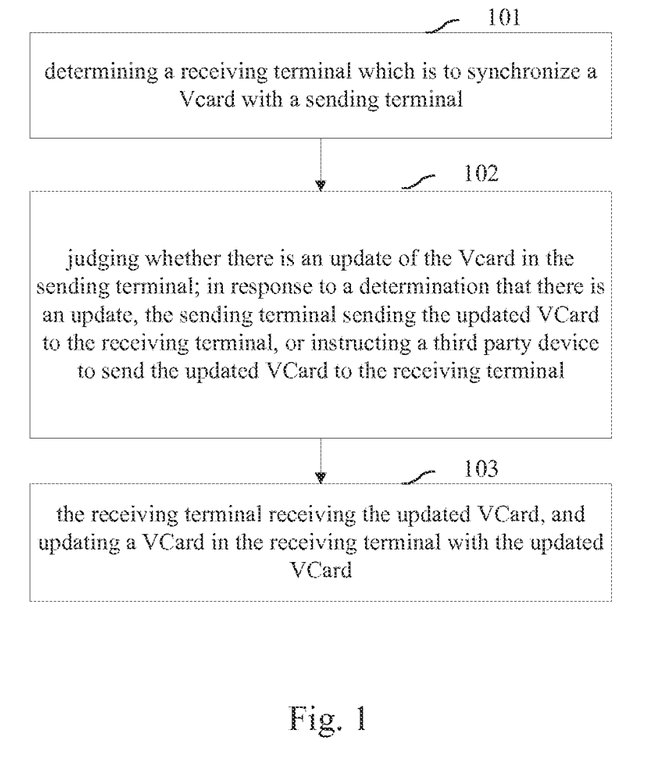
FIG. 1 is a flowchart illustrating a method for updating VCards in accordance with various embodiments of the present disclosure.

FIG. 1 is a flowchart illustrating a method for updating VCards in accordance with various embodiments of the present disclosure.

As shown in FIG. 1, the process may include the following procedures.

Block 101: a receiving terminal, which is to synchronize a VCard with a sending terminal, is determined. The sending terminal refers to a device having basic communication functions and information inputting/outputting functions. For example, the sending terminal may include, but is not limited to, a feature phone, a smart phone, a palm computer, a PC, a tablet computer, a PDA, or the like.

The sending terminal stores multiple VCards, e.g., a VCard of the owner of the sending terminal, VCards of contacts of the owner of the sending terminal, etc. In various embodiments, an update of any VCard stored in the sending terminal may affect the communication with other users, thus, there may be various types of demand for updating the VCards. For example, assuming that the owner of the sending terminal is user A and the sending terminal stores a VCard of user A, contacts of user A may have the need of updating the VCard of user A after the VCard of user A is modified in the sending terminal. For another example, assuming that the owner of the sending terminal is user A and the sending terminal stores a VCard of user A and a VCard of user B, contacts of user A and/or contacts of user B may have the need of updating the VCard of user B after the VCard of user B is modified in the sending terminal.

Therefore, the receiving terminal which is to synchronize the VCard with the sending terminal is determined. If there are multiple receiving terminals, a list of receiving terminals, also referred to as a contact list of the sending party, may be generated. The list may be stored in the sending terminal in advance, or stored in a server. Receiving terminals in the list may be terminals that exchanged VCards with the sending terminal.

The receiving terminal also refers to a device having basic communication functions and information inputting/outputting functions. For example, the receiving terminal may include, but is not limited to, a feature phone, a smart phone, a palm computer, a PC, a tablet computer, a PDA, or the like, and may be a different type of terminal from the sending terminal. A terminal may have functions of the sending terminal and functions of the receiving terminal at the same time. In some situations, the terminal may serve as the sending terminal and may serve as the receiving terminal in other situations. The two roles of the terminal are differentiated here merely for facilitating description.

In various embodiments, during the process of determining the receiving terminal, which is to synchronize a VCard with the sending terminal, a receiving terminal that had previously received the VCard may be first found out and determined as the receiving terminal, which is to synchronize the VCard with the sending terminal. In various embodiments, the sending terminal may record information of a terminal when sending a VCard to the terminal. When it is required to determine the receiving terminal to synchronize the VCard, the sending terminal may search recorded information for a terminal that received the VCard and determine the terminal determined to be the terminal that is to synchronize the VCard. For example, the history of exchanging VCards and/or communications between users may be recorded and maintained by a third party device such as a server. The server may record information of communication partners of a user, information of users that had communications with the user within a time period, and the like. Users may communicate using one or multiple phone calls, SMS, instant messages, emails, and the like. The manner of obtaining the information of the communications may be determined through negotiation between providers of different communication platforms. For example, it may be negotiated that different communication platforms exchange communication information of users in a respective communication platform, or a server of a communication platform may be allowed to obtain communication information of users from servers of other communication platforms in an approach pre-determined through negotiation, or a cross-platform server (or server cluster) may obtain communication history of a user from the multiple platforms maintained by the server, or the like.

In various embodiments, when determining that the receiving terminal is to synchronize a VCard with the sending terminal, a group of contacts may be selected from multiple contact groups stored in the sending terminal, and terminals belonging to the selected group may be determined as the receiving terminals that are to synchronize the VCard with the sending terminal. The selected group may be the contact group to which the user whose information is recorded in the VCard to be synchronized, or may be a pre-defined contact group. For example, assuming that the terminal of user A is the sending terminal, and user A wants to synchronize updated VCards only with a contact group labeled "Close Friends", user A may configure the contact group "Close Friends" as the contact group to synchronize VCards with user A. In case of an update, the sending terminal obtains settings configured by the user, and determines the contact group "Close Friends" as the group to synchronize the updated VCard with the sending terminal. In another example, after the VCard of user B is updated, the sending terminal of user A or a third-party device may determine a contact group to which user B belongs in the sending terminal, e.g., the contact group labeled as "College Schoolmates" or "Colleagues", as the contact group to synchronize the VCard of user B with the sending terminal.

In various embodiments, when determining the receiving terminal to synchronize a VCard with the sending terminal, a communication frequency between the sending terminal and each contact may be calculated based on history communication information, and contacts whose communication frequency exceeds a pre-defined threshold are determined as the receiving terminal to synchronize the VCard with the sending terminal.

In various embodiments, the receiving terminal may be selected using factors such as total history call time with the sending terminal, the total number of history messages exchanged with the sending terminal, and the like.

In various embodiments, a threshold may be set up for the total history call time with the sending terminal, e.g., 10 hours. Then, a receiving terminal that has a total history call time exceeding 10 hours with the sending terminal is selected. The selected receiving terminal is regarded as having frequent communications with the sending terminal, and thus is regarded as the receiving terminal to synchronize the VCard with the sending terminal.

The above describes a method of determining a receiving terminal that is to synchronize a VCard with the sending terminal by taking total history call time as the criterion measuring communication frequency. One with ordinary skill in the art will understand the above process is merely an example. In various embodiments, other criteria for measuring communication frequency may include total number of history messages or the like, which are not restricted in the present disclosure.

In various embodiments, a list of receiving terminals, which are to synchronize a VCard with the sending terminal, may be established in advance in the sending terminal or in a third-party device.

The procedure of determining a receiving terminal to synchronize the VCard with the sending terminal may include determining at least one receiving terminal in the list of receiving terminal as the receiving terminal which is to synchronize the VCard with the sending terminal.

The above are merely examples of the procedure for determining the receiving terminal and are for illustrative purposes only, not for limiting the protection scope of the present disclosure.

Block 102: it is judged whether there is an update of VCards stored in the sending terminal and the sending terminal sends an updated VCard to the receiving terminal or instructs a third party device to send the updated VCard to the receiving terminal if there is an update.

A VCard generally includes attribute information of a person, e.g., name, nickname, gender, address information, phone number, marital status, workplace, e-mail address, notes, and the like, and may also include a head portrait and an audio clip for self-introduction.

Each element of contents in a VCard may be modified according to the needs. If substantial changes are made to a VCard, it is determined that the VCard is updated. If contents in a VCard are substantially the same with the previous contents, although addition, deletion or modification of information is carried out, it is determined the VCard is not updated.

In response to a determination that a VCard in the sending terminal is updated, the updated VCard may be sent to the receiving terminal directly or indirectly.

Figure 2:
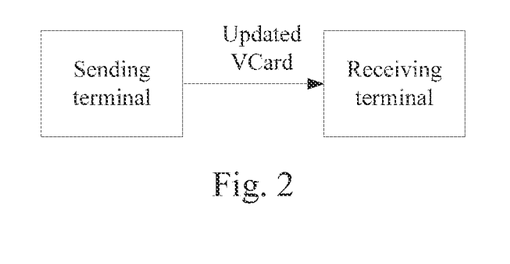
FIG. 2 is a diagram illustrating a process of delivering an updated VCard directly between a sending terminal and a receiving terminal in accordance with various embodiments of the present disclosure.

FIG. 2 is a diagram illustrating a process of delivering an updated VCard directly between a sending terminal and a receiving terminal in accordance with various embodiments of the present disclosure.

In various embodiments, the sending terminal may obtain an updated VCard by receiving information input by a user for updating a VCard or by receiving the updated VCard from a fourth party device. The sending terminal may then send the updated VCard to the receiving terminal via a data message channel or a radio message channel. In various embodiments, the sending terminal may receive the updated VCard from a fourth party device which is an entity independent from the sending terminal, the receiving terminal, and the third party device.

Figure 3:
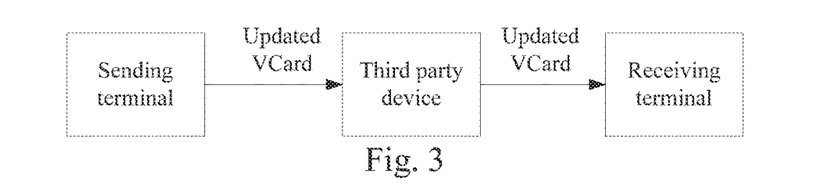
FIG. 3 is a diagram illustrating a process of delivering an updated VCard between a sending terminal and a receiving terminal via a third party device in accordance with various embodiments of the present disclosure.

FIG. 3 is a diagram illustrating a process of delivering an updated VCard between a sending terminal and a receiving terminal via a third party device in accordance with various embodiments of the present disclosure.

In various embodiments, the sending terminal may send a VCard update request to the third party device. The VCard update request may include an identity of the receiving terminal and the updated VCard. The third party device parses the VCard update request to extract the updated VCard and the identity of the receiving terminal, and sends the updated VCard to the receiving terminal identified by the identity of the receiving terminal.

In various embodiments, the third party device may reside in a server at the network side. The server may store a copy of VCards stored in the sending terminal before the process starts. In various embodiments, a VCard may be stored in the sending terminal or in the third party device (e.g., a server). When the VCard stored in the sending terminal is inconsistent with that stored in the third party device, the VCard may be selected to be synchronized or not according to the needs. If it is required that the VCards stored in the sending terminal and in the third party device stay consistent, a synchronization process may be performed to make the VCards consistent.

In various embodiments, the synchronization process may include the sending terminal sends a VCard synchronization request to the third party device, the third party device makes VCards stored in the third party device synchronized with VCards stored in the sending terminal.

In various embodiments, one or multiple sets of VCards may be stored in the sending terminal or the third party device, and the user may choose which set of VCards is to be used according to the needs.

In various embodiments, the procedure of the sending terminal sending the updated VCard to the receiving terminal may include the sending terminal obtains the updated VCard by receiving information input by a user or by receiving the updated VCard from a fourth party device and obtains processing capability information of the receiving terminal; the sending terminal selects a communication channel according to the processing capability information of the receiving terminal; the sending terminal sends the updated VCards to the receiving terminal via the selected communication channel.

As such, the sending terminal is capable of making a judgment regarding the processing capabilities of the receiving terminal and selecting a communication channel based on the condition of the processing capabilities of the receiving terminal. For example, the processing capability information may include: online/offline status of the receiving terminal, network conditions of the receiving terminal, other conditions decided by the data processing capability of the receiving terminal, and the like.

In various embodiments, the communication channel may be selected by presenting prompt information to a user and receiving selection information input by the user, or according to pre-defined settings in the sending terminal or the server. In various embodiments, the settings in the sending terminal or the server may be given a priority higher than other manners for selecting the communication channel.

In various embodiments, the technical mechanism may be applied to cross-platform scenarios. In various embodiments, the channels may include data message channels and radio message channels. The data message channels refer to data connections provided by a GPRS network, a wifi network or the like, and used by an application such as a micro chat app, an audio chat app, or the like. The radio message channels refer to channels transporting data using standardized communications protocols, e.g., SMS messages or the like.

Block 103: the receiving terminal receives the updated VCard and updates a VCard stored in the receiving terminal using the updated VCard.

The receiving terminal may receive the VCard directly from the sending terminal through various communication methods, or receives the VCard from the third party device.

With respect to directions and time of data transportation, communication methods between the receiving terminal and the sending terminal/the third party device may include simplexing, two-way simplexing, duplexing, and the like.

In simplexing communications, simplexing channels are uni-directional channels, thus the role of the sending terminal/the third party device and the receiver are fixed, therefore, the sending terminal/the third party device can only send data and cannot receive data. The receiving terminal only receives data, it does not send data. Data signals are transmitted only from one end to the other, i.e., the data flows uni-directionally.

Two-way simplexing can achieve bi-directional communication, but the communications in both directions cannot be carried out at the same time, rather, they take turns. That is, each end of the communication channel can be a sending end and a receiving end. However, data can only be transmitted in one direction at a time, as walkie-talkies used in daily life.

In duplexing communication, bi-directional transmission of data exists in the connection at any time. Duplexing communications allow bi-directional data transmission at the same time, thus is also referred to as simultaneous two-way transmission, i.e., the two communicating parties can send and receive data at the same time. Under duplexing module, each end of the communication system is equipped with a sending unit and a receiving unit for controlling simultaneous data transmission in both directions. Duplexing module does not require shift of the transmission direction, thus generates no delay for the shifting.

In various embodiments, the receiving terminal may decide on a communication protocol through negotiation with the sending terminal or the third party device. The communication protocol specifies the format of data fields, contents and meanings of the data fields, communication manner, and timing of sending and receiving data so that the data can be successfully delivered to the destination.

In various embodiments, the communication protocol may include, but is not limited to, TCP/IP, HTTP, SMTP, POP3, and the like. The receiving terminal may receive data using various communication standards. For example, the communication standards may include GSM, WCDMA, CDMA-2000, TD-SCDMA, and the like. The receiving terminal may adopt various communication manners for receiving the VCard. In various embodiments, the communication manners may include, but are not limited to, SMS, email, instant messaging (IM) messages, MMS, voice, and the like. The above listed communication manners merely serve as examples, not for limiting the protection scope. In various embodiments, the receiving terminal parses the received updated VCard to obtain a user identity in the updated VCard, searches in the receiving terminal for an old VCard having the user identity, and updates the old VCard using the received VCard.

The user identity refers to the value of one or multiple fields stored in the VCard, e.g., the value of one or multiple fields such as a phone number, an account ID in an IM service, a name, an email address, and the like that can serve as information identifying the user.

When all information in a VCard of a user is modified, i.e., all of the values of the one or multiple fields serving as the user identity are changed, the old VCard that needs to be updated cannot be identified using the user identity. Therefore, different update methods may be adopted according to whether all information of a VCard is updated.

In response to a determination that the VCard is partially modified, the receiving terminal or the sending terminal may identify the old VCard using a pre-defined keyword (e.g., any or any combination of a phone number, an IMEI number, an IM account ID and the like), and replace the old VCard with the modified VCard.

In response to a determination that the VCard is totally modified, a VCard that has the highest similarity with the modified VCard regarding content is identified, and the VCard is updated using the modified VCard. In various embodiments, a threshold of the percentage of similarity is pre-defined. When the similarity between an old VCard and an updated VCard exceeds the threshold, a determination is made that the old VCard is to be replaced by the updated VCard.

In various embodiments, if a user updates a phone book or creates a new VCard, a default VCard template may be provided to the user for updating VCards.

In various embodiments, before the procedure of the sending terminal sending the updated VCard to the receiving terminal, the method may also include judging whether all information in the updated VCard has been modified, calculating a similarity between the updated VCard and an old VCard in response to a determination that all information in the updated VCard has been modified, replacing the old VCard with the updated VCard in response to a determination that the similarity is higher than a pre-defined threshold, or replacing an old VCard that has the highest similarity with the updated VCard.

In various embodiments, before the procedure of the sending terminal sending the updated VCard to the receiving terminal, the method may also include judging whether all information in the updated VCard has been updated, parsing the updated VCard to obtain a user identity in response to a determination that not all information in the updated VCard has been updated, searching for an old VCard that includes the user identity, and replacing the old VCard with the updated VCard.

Figure 4:
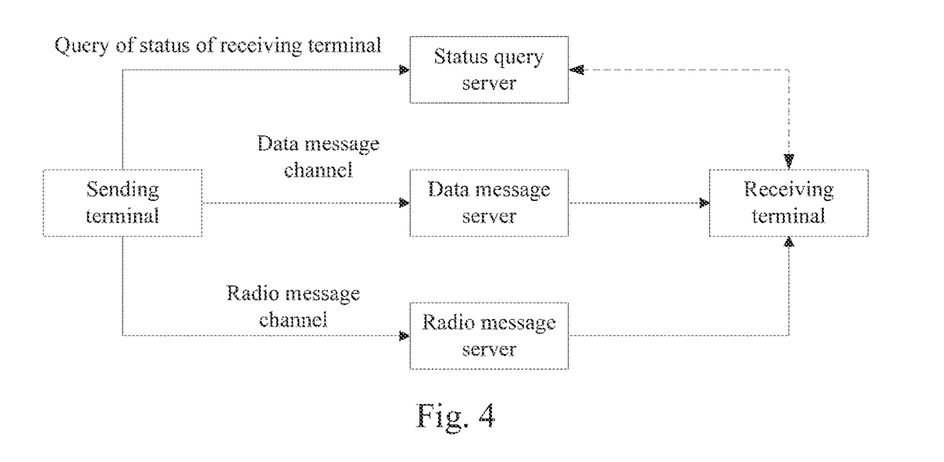
FIG. 4 is a diagram illustrating a process for updating VCards in accordance with various embodiments of the present disclosure.

FIG. 4 is a diagram illustrating a process for updating VCards in accordance with various embodiments of the present disclosure. In FIG. 4, the sending terminal may obtain an online/offline status of the receiving terminal from a status query server, and select a communication channel based on the online/offline status of the receiving terminal. In various embodiments, when the receiving terminal is offline, the sending terminal may select a radio message channel to transmit the data; when the receiving terminal is online, the sending terminal may select a data message channel to transmit the data.

Accordingly, various embodiments of the present disclosure also provide a system for updating VCards.

Figure 5:
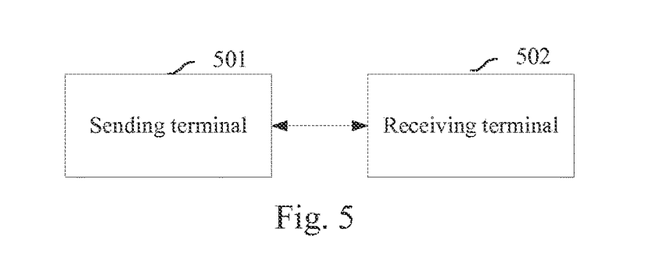
FIG. 5 is a diagram illustrating modules of a system for updating VCards in accordance with various embodiments of the present disclosure.

FIG. 5 is a diagram illustrating modules of a system for updating VCards in accordance with various embodiments of the present disclosure. As shown in FIG. 5, the system may include a sending terminal 501 and a receiving terminal 502.

The sending terminal 501 is configured for determining a receiving terminal which is to synchronize a VCard with the sending terminal, judging whether there is an update of the VCard in the sending terminal, sending an updated VCard to the receiving terminal, or instructing a third party device to send the updated VCard to the receiving terminal in response to a determination that there is an update.

The receiving terminal 502 is configured for receiving the updated VCard and updating a VCard stored in the receiving terminal using the updated VCard.

In various embodiments, the sending terminal 501 is configured for searching for terminals that had received the VCard, and determining the at least one terminal found out as the receiving terminal which is to synchronize a VCard with the sending terminal.

In various embodiments, the sending terminal 501 is configured for selecting from multiple groups of contacts stored in the sending terminal 501 a group of contacts as the receiving terminals that are to synchronize the VCard with the sending terminal; and/or identifying a terminal whose communication frequency with the sending terminal 501 exceeds a pre-defined threshold based on history communication information, and taking a terminal identified as the receiving terminal that is to synchronize the VCard with the sending terminal 501.

In various embodiments, the sending terminal 501 is configured for obtaining the updated VCard by receiving information input by a user or by receiving the updated VCard from a fourth party device, and sending the updated VCard to the receiving terminal via a data message channel or a radio message channel. In various embodiments, the sending terminal 501 is configured for sending a VCard update request to a third party device, the VCard update request includes an identity of the receiving terminal and the updated VCard. The third party device is configured for parsing the VCard update request to obtain the updated VCard and the identity of the receiving terminal and sending the updated VCard to the receiving terminal identified by the identity of the receiving terminal. In various embodiments, the sending terminal 501 is configured for sending a VCard update request to the third party device. The third party device is configured for making a VCard stored in the third party device synchronized with the VCard stored in the sending terminal.

In various embodiments, the sending terminal 501 is configured for obtaining the updated VCard by receiving information input by a user or receiving the updated VCard from a fourth party device, obtaining processing capability information of the receiving terminal, selecting a communication channel based on the processing capability information of the terminal device, and sending the updated VCard to the receiving terminal via the selected communication channel.

In various embodiments, the sending terminal 501 is configured for selecting a communication channel based on an online/offline status of the receiving terminal or based on the network conditions of the receiving terminal or based on a condition decided by data processing capabilities of the receiving terminal.

In various embodiments, the receiving terminal 502 is configured for parsing the updated VCard to obtain a user identity included in the updated VCard, searching in the receiving terminal for an old VCard having the user identity, and updating the old VCard using the updated VCard.

In various embodiments, the sending terminal 501 is configured for judging whether all information in the updated VCard has been modified, calculating a similarity between the updated VCard and an old VCard in response to a determination that all information in the updated VCard has been modified, replacing the old VCard with the updated VCard in response to a determination that the similarity is higher than a pre-defined threshold or replacing an old VCard that has the highest similarity with the updated VCard.

In various embodiments, the sending terminal 501 is configured for judging whether all information in the updated VCard has been updated, parsing the updated VCard to obtain a user identity in response to a determination that not all information in the updated VCard has been updated, searching for an old VCard that includes the user identity, and replacing the old VCard with the updated VCard.

The system as shown in FIG. 5 may be applied to various communication networks. For example, the sending terminal may include, but is not limited to, a feature phone, a smart phone, a palm computer, a PC, a tablet computer, a PDA, or the like.

Various forms may be adopted to implement the VCard updating method and/or system. In various embodiments, the sending terminal and/or the receiving terminal may be programmed as a plugin that can be installed in a mobile terminal based on certain application interface standards, or may be encapsulated into an application which can be downloaded and used by users. When the terminals are programmed to be a plug-in, the format of the plug-in may be ocx, dll, cab, or the like. The terminals may also be implemented by a Flash plug-in, a RealPlayer plug-in, an MMS plug-in, a MIDI plug-in, an ActiveX plug-in, or the like.

The VCard updating method may be stored in various types of storage medium in the form of instructions or an instruction sets. The storage medium may include, but is not limited to, floppy disk, compact disk, DVD, hard drive, flash memory, USB flash disk, CF card, SD card, MMC card, SM card, memory stick, xD card, and the like.

The method may also be implemented by Nand flash-based storage medium, such as USB flash disk, CF card, SD card, MMC card, SM card, memory stick, xD card, and the like.

According to various embodiments, when user A updates a VCard of user A or of another user in the sending terminal, other users that also have the previous version of the VCard can use receiving terminals to receive the updated VCard sent directly or indirectly by the sending terminal, and update the previous version of the VCard using the received VCard. When a VCard is partially or totally modified, the VCard can be replaced both in the sending terminal and the receiving terminal.

According to the above technical mechanism provided by various embodiments of the present disclosure, a receiving terminal which is to synchronize a VCard with a sending terminal is determined, it is judged whether there is an update of VCards stored in the sending terminal; if there is an update, the sending terminal sends an updated VCard to the receiving terminal or instructs a third party device to send the updated VCard to the receiving terminal; the receiving terminal receives the updated VCard, and updates a VCard stored in the receiving terminal using the updated VCard. As such, after a VCard is updated, another user that stores the previous VCard may receive the updated VCard timely and automatically update the VCard. Therefore, the efficiency of updating VCards is improved.

In addition, according to various embodiments, when some or all of user information in a VCard is changed, the previous VCard can be updated in both the sending terminal and the receiving terminal.

Further, according to various embodiments, other users may get information about the update of a VCard of a contact in a timely manner. As such, users can establish communication using correct contact information and potential economic loss can be avoided.

The various embodiments can be applied to various terminal devices and to terminal devices running different platforms, and thus has wide applicability.

It should be understood that in the above processes and structures, not all of the procedures and modules are necessary. Certain procedures or modules may be omitted according to the needs. The order of the procedures is not fixed and can be adjusted according to the needs. The modules are defined based on function simply for facilitating description. In implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

In various embodiments, a module may be implemented by hardware and or machine-executable instructions. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

A machine-readable storage medium is also provided, which is to store instructions executable by a machine to implement the method of various examples. Specifically, a system or apparatus may have a storage medium which stores machine-readable program codes for implementing functions of any of the above examples. A computing device (or a CPU or an MPU) in the system or the apparatus may read and execute the program codes stored in the storage medium. In addition, the program codes may cause an operating system running in a computer to implement part or all of the operations. In addition, the program codes may be read from a storage medium and may be written in a storage device in an extension board inserted in the computer or in a storage device in an extension unit connected to the computer. In this example, a CPU in the extension board or the extension unit executes at least part of the operations according to the instructions of the program codes to realize the technical mechanism of any of the above examples.

The storage medium for providing the program codes may include a floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM, and so on. Optionally, the program code may be downloaded from a server computer via a communication network.

The scope of the claims should not be limited by the embodiments set forth in the examples, but should be given the broadest interpretation consistent with the description as a whole.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for updating electronic business cards, comprising:
    storing a list of at least one first contact of a user, the at least one first contact is to synchronize an electronic business card (VCard) of a second contact of the user with a sending terminal of the user;
    judging, by the sending terminal of the user, whether there is an update of the VCard of the second contact stored in the sending terminal;
    sending, by the sending terminal, an updated VCard of the second contact to a receiving terminal of a first contact in the list if there is an update of the VCard of the second contact, or instructing, by the sending terminal, a third party device to send the updated VCard of the second contact to the receiving terminal if there is an update of the VCard of the second contact; and
    receiving, by the receiving terminal, the updated VCard, and updating a VCard of the second contact stored in the receiving terminal using the updated VCard.

2. The method of claim 1,
    wherein the list is stored in the sending terminal or in the third party device in advance.

3. The method of claim 1, wherein storing the list of at least one first contact of the user comprises:
    finding out a receiving terminal of a contact which previously received the VCard of the second contact;
    adding the contact to the list as a first contact which is to synchronize the VCard of the second contact with the sending terminal.

4. The method of claim 1, wherein storing the list of at least one first contact of the user comprises:
    selecting a contact group from plural contact groups in the sending terminal as a group of first contacts which are to synchronize the VCard of the second contact with the sending terminal; and/or
    identifying a contact whose frequency of communication with the sending terminal exceeds a pre-defined threshold based on history communication information, and adding the contact to the list as a first contact which is to synchronize the VCard of the second contact with the sending terminal.

5. The method of claim 1, wherein sending by the sending terminal the updated VCard to the receiving terminal comprises:
sending, by the sending terminal, the updated VCard of the second contact to the receiving terminal via a data message channel or a radio message channel.

6. A method for updating electronic business cards, comprising:
determining a receiving terminal which is to synchronize a electronic business card (VCard) with a sending terminal;
judging whether there is an update of a VCard stored in the sending terminal, sending, by the sending terminal, an updated VCard to the receiving terminal, or instructing, by the sending terminal, a third party device to send the updated VCard to the receiving terminal if there is an update; and
receiving, by the receiving terminal, the updated VCard, and updating a VCard stored in the receiving terminal using the updated VCard;
wherein instructing, by the sending terminal, the third party device to send the updated VCard to the receiving terminal comprises:
sending, by the sending terminal, a VCard update request to the third party device, the VCard update request comprising an identity of the receiving terminal and the updated VCard; and
parsing, by the third party device, the VCard update request to obtain the updated VCard and the identity of the receiving terminal, and sending the updated VCard to the receiving terminal identified by the identity of the receiving terminal.

7. The method of claim 6, further comprising:
sending, by the sending terminal, the VCard update request to the third party device;
making, by the third party device, a VCard stored in the third party device synchronized with the VCard stored in the sending terminal.

8. The method of claim 1, wherein sending by the sending terminal the updated VCard to the receiving terminal comprises:
obtaining, by the sending terminal, processing capability information of the receiving terminal;
selecting, by the sending terminal, a communication channel based on the processing capability information of the receiving terminal; and
sending, by the sending terminal, the updated VCard via the selected communication channel to the receiving terminal.

9. The method of claim 8, wherein the selecting a communication channel based on the processing capability information of the receiving terminal comprises:
selecting, by the sending terminal, a communication channel based on an online/offline status of the receiving terminal; or
selecting, by the sending terminal, a communication channel based on network conditions of the receiving terminal; or
selecting, by the sending terminal, a communication channel based on a condition decided by data processing capabilities of the receiving terminal.

10. The method of claim 1, wherein the updating a VCard stored in the receiving terminal using the updated VCard comprises:

parsing the updated VCard to obtain an identity of a user;
searching for an old VCard having the identity of the user, and replacing the old VCard using the updated VCard.

11. The method of claim 1, further comprising:
judging whether all information in the updated VCard has been changed,
calculating a similarity between the updated VCard and an old VCard in response to a determination that all information in the updated VCard has been changed, and identifying an old VCard that has the highest similarity;
replacing the old VCard having the highest similarity with the updated VCard; or judging whether the similarity between the old VCard and the updated VCard exceeds a pre-defined threshold, and replacing the old VCard with the updated VCard in response to a determination that the similarity exceeds the pre-defined threshold;
parsing the updated VCard to obtain a user identity in response to a determination that not all information in the updated VCard has been updated, searching for an old VCard that includes the user identity, and replacing an old VCard found with the updated VCard.

12. A system for updating electronic business cards, including a sending terminal and a receiving terminal; wherein the sending terminal is configured for determining a list of at least one first contact of a user of a sending terminal, the at least one first contact is to synchronize an electronic business card (VCard) of a second contact of the user with the sending terminal; judging whether there is an update of the VCard of the second contact stored in the sending terminal; sending an updated VCard of the second contact to a receiving terminal of a first contact in the list or instructing a third party device to send the updated VCard to the receiving terminal in response to a determination that there is an update of the VCard of the second contact; and the receiving terminal is configured for receiving the updated VCard, and updating a VCard stored in the receiving terminal using the updated VCard.

13. The system of claim 12, wherein
the sending terminal is configured for searching for a contact that previously received the VCard of the second contact, and adding the contact found into the list as a first contact which is to synchronize the VCard of the second contact with the sending terminal.

14. The system of claim 12, wherein
the sending terminal is configured for selecting a contact group from plural contact groups in the sending terminal as a group of first contacts which are to synchronize the VCard of the second contact with the sending terminal; and/or
identifying a contact whose frequency of communication with the sending terminal exceeds a pre-defined threshold based on history communication information, and adding the contact into the list as a first contact which is to synchronize the VCard of the second contact with the sending terminal.

15. The system of claim 12, wherein
the sending terminal is configured for obtaining the updated VCard of the second contact by receiving information of the second contact inputted by a user or by receiving the updated VCard of the second contact from a fourth party device, and sending the updated VCard to the receiving terminal via a data message channel or a radio message channel.

16. The system of claim 12, wherein
the sending terminal is configured for sending a VCard update request to the third party device, the VCard update request comprising an identity of the receiving terminal and the updated VCard; and the third party device is configured for parsing the VCard update request to obtain the updated VCard and the identity of the receiving terminal, and sending the updated VCard to the receiving terminal identified by the identity of the receiving terminal.

17. The system of claim 16, wherein the sending terminal is configured for sending a VCard update request to the third party device;

the third party device is configured for making a VCard of the second contact stored in the third party device consistent with the VCard of the second contact stored in the sending terminal.

18. The system of claim 12, wherein the sending terminal is configured for obtaining the updated VCard of the second contact by receiving information of the second contact inputted by a user or receiving the updated VCard of the second contact from a fourth party device, obtaining processing capability information of the receiving terminal, selecting a communication channel based on the processing capability information of the terminal device, and sending the updated VCard of the second contact to the receiving terminal via the selected communication channel.

19. The system of claim 18, wherein the sending terminal is configured for selecting a the communication channel based on an online/offline status of the receiving terminal or based on the network conditions of the receiving terminal or based on a condition decided by data processing capabilities of the receiving terminal.

20. The system of claim 12, wherein the sending terminal is configured for judging whether all information in the updated VCard has been modified, calculating a similarity between the updated VCard and an old VCard in response to a determination that all information in the updated VCard has been modified, replacing the old VCard with the updated VCard in response to a determination that the similarity exceeds a pre-defined threshold, or replacing an old VCard that has the highest similarity with the updated VCard;

parsing the updated VCard to obtain a user identity in response to a determination that not all information in the updated VCard has been modified, searching for an old VCard that includes the user identity, and replacing the old VCard with the updated VCard.

* * * * *